United States Patent Office 3,118,943
Patented Jan. 21, 1964

3,118,943
AMINOBENZYLSULFONYLETHANOL
COMPOUNDS
Saul R. Buc, Easton, Pa., and David I. Randall, New Vernon, N.J., assignors to General Aniline & Film Corporation, New York, N.Y., a corporation of Delaware
No Drawing. Filed Dec. 8, 1959, Ser. No. 858,034
3 Claims. (Cl. 260—575)

This invention relates to the provision of aminobenzylsulfonylethanol compounds and more particularly to the provision of a novel group of aminobenzene compounds containing at least one meta-substituted

—$CH_2SO_2CH_2CH_2OH$ (methylenesulfonylethanol) group. These compounds have been found to constitute highly desirable intermediates for the preparation of dyestuffs reactive with textile fibers and the like, as will be pointed out more fully below.

The objects and advantages of this invention are accordingly embodied in the provision of a group of compounds which may be broadly described as aminobenzene compounds containing at least one meta-substituted methylenesulfonylethanol group. In a more specific sense, the compounds of this invention are those having the formula

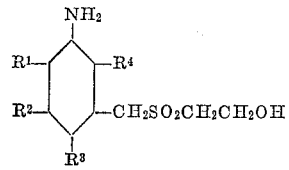

wherein $R^1$, $R^3$ and $R^4$ are selected from the group consisting of H, halogen, lower alkyl and lower alkoxy, and $R^2$ is selected from the group consisting of H, lower alkyl, lower alkoxy, halogen and —$CH_2SO_2CH_2CH_2OH$. In this formula, $R^1$, $R^3$ and $R^4$ may be H, chloro, bromo, methyl, ethyl, methoxy or ethoxy or the like or any combination thereof. $R^2$ may have any of the values defined for $R^1$, $R^3$ and $R^4$ and may also be —$CH_2SO_2CH_2CH_2OH$.

The invention also includes a process for producing an aminobenzene compound containing at least one meta-substituted methylenesulfonylethanol group by reduction of the corresponding nitrobenzene compound containing at least one meta-substituted methylenesulfonylethanol group. The invention also resides in a process for producing a compound having the structural formula given above by reduction of a compound of the formula

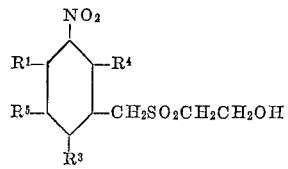

wherein $R^1$, $R^3$ and $R^4$ have the values given above and $R^5$ may have a similar value or may be

—$CH_2SO_2CH_2CH_2OH$

Examples of the nitro-containing intermediates employed in the present process and methods for their production are disclosed and claimed in our copending application Serial No. 858,035 filed on even date herewith, and now U.S. Patent No. 3,019,226. These intermediates may generally be prepared by reaction of an appropriately substituted or unsubstituted nitrobenzene compound containing at least one meta-substituted methylenemercaptoethanol group (—$CH_2SCH_2CH_2OH$) with a molar amount of hydrogen peroxide about double the number of such groups in said compound.

As examples of such nitro-containing intermediates which may be subjected to reduction for the production of the corresponding amino-containing compounds in accordance with this invention, there may be mentioned 4-methoxy-3-nitrobenzylsulfonylethanol, 2-methyl-5-nitrobenzylsulfonylethanol, 4-methyl-3-nitrobenzylsulfonylethanol, 5-nitro-4-methyl-m-xylylene-$\alpha^1,\alpha^3$-bis(2-sulfonylethanol), 3-chloro-4-methyl-5-nitrobenzylsulfonylethanol, 3-chloro-6-methyl-5-nitrobenzylsulfonylethanol, 2-ethoxy-5-nitrobenzylsulfonylethanol, and 4-ethoxy-3-nitrobenzylsulfonylethanol.

The treatment of the nitrobenzene intermediate with a reducing agent to produce the corresponding desired amino compound may be carried out in any manner well known in the art. In general, the reaction should be carried out in a non-alkaline medium since in an alkaline medium, there is a tendency towards reaction and chemical modification of the essential methylenesulfonylethanol group or groups in the compound being treated. For this reason, sodium sulfide, sodium hydrosulfite and sodium sulfite and the like are not desirable.

A preferred method for carrying out the reduction involves the use of the well known reduction system containing a metal such as iron, zinc, tin or the like in a strong mineral acid such as sulfuric acid, hydrochloric acid or the like. In such systems, the theoretical proportions of metal to nitro group being introduced may be readily calculated. By way of example, two moles of iron, three moles of zinc or 1 and ½ moles of tin are theoretically required for reduction of each mole of nitro-containing compound, as will be obvious to the skilled worker. An excess of iron over the theoretical amount is in most instances called for since iron is insoluble in the reaction medium. Zinc and tin, being soluble, may be employed in close to the theoretical proportions.

An alternative method of carrying out the desired reduction involves the well known catalytic hydrogenation process involving the use of molecular hydrogen in the presence of a suitable catalyst such as Raney nickel, platinum, palladium or the like, preferably on a carrier such as charcoal or other known equivalents thereof.

The reaction is exothermic in nature and accordingly, no heat need be added in many instances. This is true for example when using zinc, tin and the like. When using iron, it is desirable to heat the reaction medium to or near the boiling point to initiate the reaction, whereafter the reaction is preferably maintained at boiling temperature. As stated, the temperatures, durations, reducing agents and other conditions of reaction required to reduce the present nitro-containing intermediates to the corresponding desired amino compounds will be obvious to persons skilled in the art.

The nitro-containing starting compounds and the final products herein are essentially soluble in the aqueous reaction medium at the elevated temperatures involved, which may in general range from 60° C. to the boiling point. Following completion of the reaction, the reaction medium is neutralized with an alkaline substance and filtered while hot, and the filtrate cooled to precipitate the desired product in the form of crystals or the like which may be readily separated by filtration. The product may then be further purified in any desired manner such as by recrystallization, solvent extraction, or the like.

As stated above, the products of this invention are surprisingly effective in the production of dyestuffs and other substances reactive with textile fibers. For example, the products of the below examples may be reacted with a halogenated dyestuff of the anthraquinone series, azo series, etc. with liberation of a hydrohalide. α-Anthraquinone may be employed. These amino compounds may also be employed in the production of novel reactive phthalocyanine dyestuffs as disclosed in the application of Buc et al., Serial No. 855,550, filed on November 27, 1959, and now U.S. Patent Number 3,062,830. Such dyestuffs are reactive with textile fibers and the like to produce dyeings having unexpectedly improved wash fastness properties and the like. It has been surprisingly found that isomers of the products of this invention containing a methylenesulfonylethanol group or groups in ortho or para position relative to the amino group are substantially ineffective as suitable intermediates in the production of such dyestuffs.

The following examples are only illustrative of the present invention and are not to be regarded as limitative. All parts and proportions referred to herein and in the appended claims are by weight unless otherwise indicated.

EXAMPLE 1

5-Amino-2-Methyl-m-Xylylene-$\alpha^1,\alpha^3$-Bis(2-Sulfonylethanol)

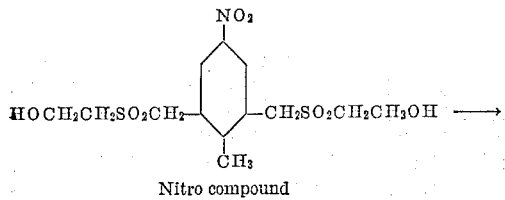

Nitro compound

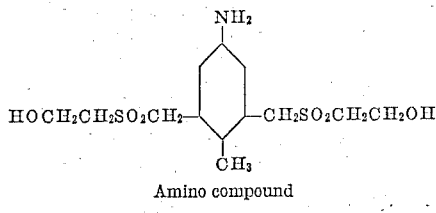

Amino compound

Into a stirred vessel, charge 2500 ml. $H_2O$, 10 ml. conc. HCl (38%), and 330 g. 60 mesh iron (6 moles). Heat to boiling and add in portions so as to keep temperature at boiling point, 381 g. (1 mole) above nitro compound. At end of addition add 10 ml. conc. HCl, continue boiling for 30 minutes. Bring to pH 8 with sodium carbonate, filter with suction on a carefully pre-heated steam heated Buchner funnel, cool filtrate, a filter product, wash with water, and dry.

Yield of amino compound=95%, M.P. 181–183° C.

EXAMPLE 2

2-Amino-o-Xylylene-$\alpha^2$-Sulfonylethanol

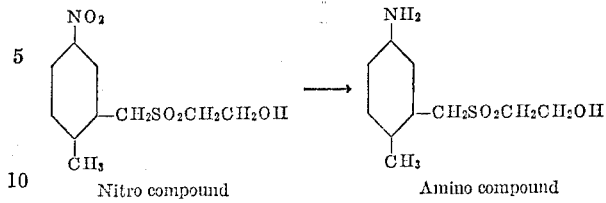

Nitro compound      Amino compound

In a stirred vessel, charge 1500 ml. water, 220 g. 60 mesh iron and 8 ml. conc. HCl (38%). Heat to boiling and add slowly 165.0 g. of the above nitro compound. Continue boiling 30 minutes after end of addition while allowing evaporation to a volume of about 1 liter. Add sodium carbonate to a pH of about 8. Filter the hot solution. On chilling the filtrate, the product crystallizes.

Yield of amino compound=137 g. 94%, M.P. 126–130° C.

This invention has been disclosed with respect to certain preferred embodiments, and various modifications and variations thereof will become obvious to persons skilled in the art and are intended to be included within the spirit and scope of this invention.

We claim:
1. A compound of the formula

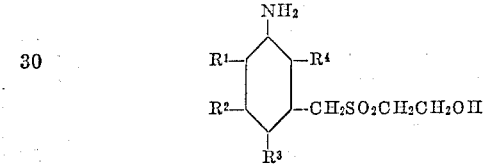

wherein $R^1$, $R^3$ and $R^4$ are selected from the group consisting of H, chloro, bromo, lower alkyl and lower alkoxy, and $R^2$ is selected from the group consisting of H, lower alkyl, lower alkoxy, halogen and —$CH_2SO_2CH_2CH_2OH$.

2. A compound as defined in claim 1 wherein $R^3$ is —$CH_3$, $R^2$ is —$CH_2SO_2CH_2CH_2OH$, and $R^1$ and $R^4$ are H.

3. A compound as defined in claim 1 wherein $R^3$ is —$CH_3$ and $R^1$, $R^2$ and $R^4$ are H.

References Cited in the file of this patent
UNITED STATES PATENTS 2,836,587    Bushler et al.    May 27, 1958

FOREIGN PATENTS 692,448    Great Britain    June 3, 1953
960,010    Germany    Mar. 14, 1957

OTHER REFERENCES

Cooper et al.: "Chem Abstracts," vol. 33, p. 1390 (1939).